METHOD AND APPARATUS FOR DETONATING EXPLOSIVE DEVICES IN BORE HOLES

Original Filed June 17, 1953 2 Sheets-Sheet 1

INVENTOR.
MAURICE P. LEBOURG
BY
Campbell, Brumbaugh, Free + Graves
HIS ATTORNEYS.

INVENTOR.
MAURICE P. LEBOURG
BY
Campbell, Brumbaugh, Free + Graves
HIS ATTORNEYS.

United States Patent Office

Re. 25,407

Reissued June 25, 1963

25,407

METHOD AND APPARATUS FOR DETONATING EXPLOSIVE DEVICES IN BORE HOLES

Maurice P. Lebourg, Houston, Tex., assignor, by mesne assignments, to Borg-Warner Corporation, Chicago, Ill., a corporation of Illinois Original No. 2,873,675, dated Feb. 17, 1959, Ser. No. 362,214, June 17, 1953. Application for reissue Feb. 26, 1960, Ser. No. 11,396

5 Claims. (Cl. 166—35)

Matter enclosed in heavy brackets [ ] appears in the original patent but forms no part of this reissue specification; matter printed in italics indicates the additions made by reissue

The present invention relates to the detonation of explosive devices and more particularly to new and improved methods and means for detonating explosives in relatively inaccessible places such as bore holes drilled into the earth, for example.

In order to prevent contamination of oil and gas producing formations by heavy drilling mud and to obtain substantial economies in drilling rig time, it has been proposed heretofore to replace the drilling mud in a well with lighter fluid before perforating the casing at the desired level. In accordance with this method, production equipment is provided at the surface, and production tubing, which has perforating apparatus permanently attached to the lower end thereof, is lowered and set when the perforating apparatus is opposite the formation to be produced. The perforating apparatus may then be detonated and the well immediately placed on production through the tubing.

However, such methods and apparatus have not proved entirely satisfactory in the past, since it was necessary to have a blasting cap in the perforating apparatus which was fixed to the lower end of the tubing. As a result, accidental firings at the wrong level during the lowering operation, or premature firings during the setting operation, were a distinct possibility. Also, in the event of a misfire, it was necessary to remove the tubing with an armed perforating gun attached to the lower end which endangered well personnel and the well itself.

Accordingly, it is an object of the invention to provide novel methods and apparatus for detonating explosive devices in relatively inaccessible places, that are free from the above-noted deficiencies of the prior art.

Another object of the invention is to provide novel explosive charge detonating methods and apparatus in which an explosive charge can be positioned in an inaccessible location without detonating means therefor, while the detonating means can be positioned in operative relation to the explosive charge whenever it is desirable to do so.

A further object of the invention is to provide novel explosive charge detonating methods and apparatus of the above character in which a misfire or premature detonation will not result in damage or a hazardous condition.

Broadly speaking, these and other objects of the invention are attained by disposing a detonating charge in a body which is adapted to pass through a bore hole, for example, to the level of an explosive charge which is to be detonated therein. Preferably, the detonating charge comprises a shaped explosive charge having a lined cavity facing the charge in the bore hole and the body also contains means for initiating detonation of the detonating charge. The body is adapted to be lowered into the bore hole on a cable which may contain electrical conductor means to supply electrical energy to electrical detonation initiating means in the body.

The invention will be better understood when the following description of a typical embodiment is read in conjunction with the appended drawings in which.

While the detonating means of the invention is susceptible of use in a wide variety of applications, it will be described herein, by way of illustration, as adapted for detonating an explosive charge device in a well in the course of completing the well.

Figure 1:
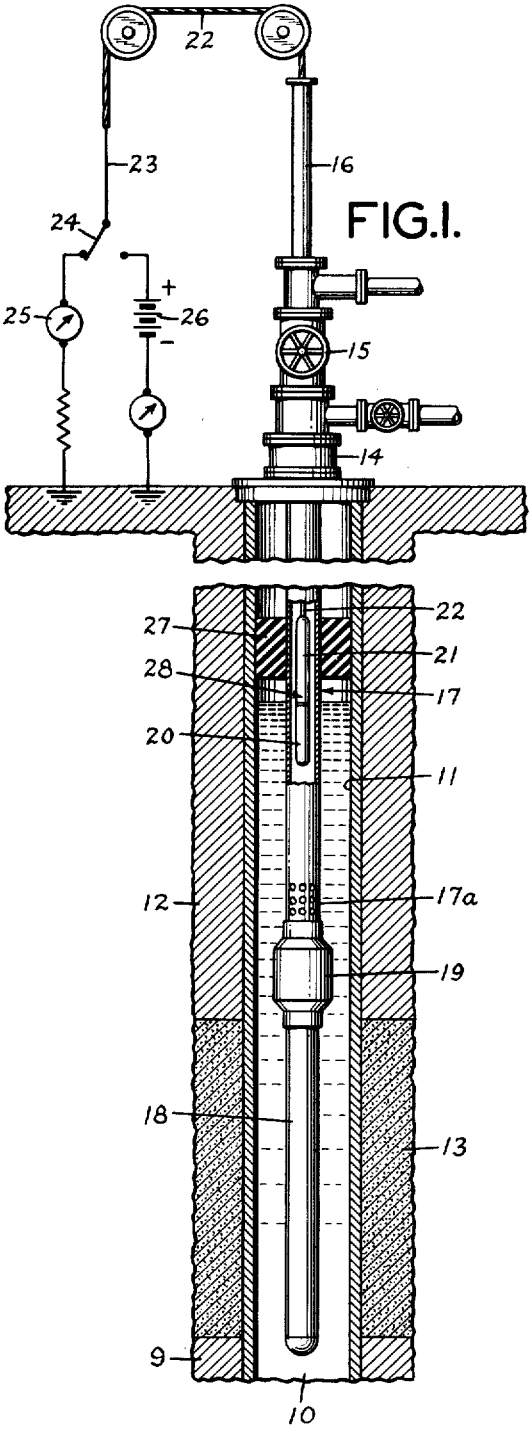
FIG. 1 shows a bore hole partially in longitudinal section in which is disposed an explosive charge device together with detonating means constructed in accordance with the present invention.
Figure 2:
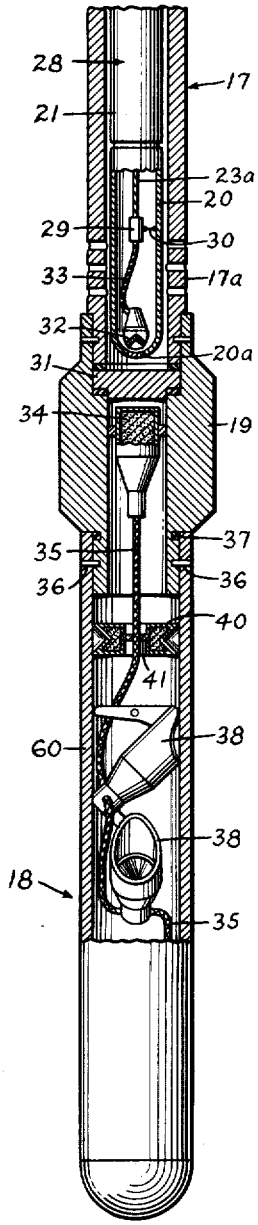
FIG. 2 is a view partly in longitudinal section showing certain details of the explosive charge and detonating means in FIG. 1.

Referring now to FIG. 1, a casing 11 in a bore hole 10 traverses earth formations 9, 12 and 13, the latter formation being potentially productive of oil or gas. The upper end of bore hole 10 is fitted with a well completion assembly 14, a conventional Christmas tree 15 and a lubricator 16. Suspended from the well completion assembly 14 and set by a packer 27 is a string of tubing 17, preferably having a nipple 17a formed at the lower end thereof. The tubing 17 is coupled by a heavy duty pressure resistant coupling 19 to a casing perforating apparatus 18, which may be of the shaped explosive charge type as shown in FIG. 2. The coupling 19 is formed with a frangible plug 31 (FIG. 2) in the upper end thereof and encloses a booster charge 34 connected to an explosive fuse 35, such as a primacord fuse. The booster charge is designed to be relatively insensitive and not readily detonated other than by a force of an explosive nature. The perforated nipple 17a, which may be either formed in the lower end of the tubing 17, as shown, or formed separately and joined to the tubing 17 permits mud removal and fluid circulation, while the plug 31 and the housing 60 are still intact.

Figure 4:
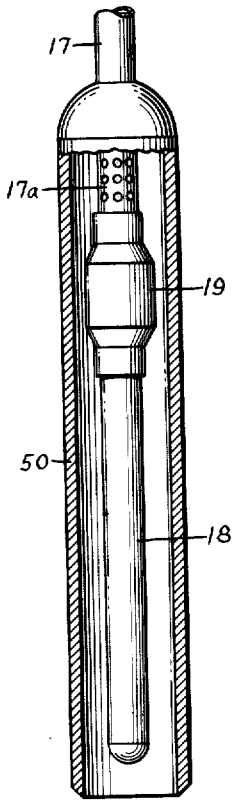
FIG. 4 is a modification of the explosive charge device of FIG. 1.

In the event the nipple 17a cannot be lowered to a position below the formation 13 because of the closeness of the latter to the bottom of the well, the apparatus shown in FIG. 4 may be employed. In that figure, a sleeve 50 extends from a position above the nipple 17a on the tubing 17 to a position below the perforating apparatus 18. Any conventional supports for the sleeve 50, not shown for simplicity, may be provided on the perforating apparatus 18 and the coupling 19 with the proviso that such supports will offer no substantial resistance to the perforating action of the apparatus 18. The sleeve 50 may be frangible so that it will substantially disintegrate upon detonation of the perforating apparatus 18. Alternatively, the sleeve 50 may be designed so as not to disintegrate but only to be perforated in the perforating operation, thus providing a screen after detonation of the perforating apparatus.

As shown in FIG. 2, the perforating apparatus 18 comprises a housing 60 constructed of frangible material such as aluminum or Permalloy, so as to disintegrate at least partially upon detonation of the enclosed explosive charges. The housing is weakly secured to the heavy duty coupling 19 by a plurality of shear pins 36. An annular seal 37 may be provided to prevent leakage of fluid into the perforating apparatus 18. A plurality of shaped explosive charge units 38 in the housing 60 are joined by an explosive fuse 35, and may be formed and interconnected in accordance with the principles set forth in the copending applications Serial No. 123,003, filed October 22, 1949, now abandoned, by A. Blanchard for "Shaped Charge Perforating Apparatus," and Serial No. 209,598, filed February 6, 1951, by H. S. Robertson for "Method and Apparatus for Perforating Well Casing and the Like."

A severing explosive charge 40, constructed in accordance with the disclosure in the copending application Serial No. 322,017, filed November 22, 1952, by G. R. Hodgson for "Expendable Shaped Explosive Charge Well Casing Perforating Apparatus," may be placed at the upper end of the housing 60 to insure separation of the housing from the coupling 19 during a perforating operation. In this instance, the charge 40 may comprise an annular, shaped explosive charge generating a circumferential jet. The fuse 35 may be coupled to the charge 40 by a time delay fuse 41 to insure that the charges 38 will be detonated prior to detonation of the charge 40. Other severing means such as a coil of primacord fuse may be employed.

In one manner of firing the perforating apparatus, according to the invention, a small diameter carrier 28, as shown in FIGS. 1 and 2, is adapted to be lowered into the tubing 17 through the lubricator 16 by means of a cable 22 including an electrical conductor 23. A casing collar locator 21, which may be constructed in accordance with the principles set forth in U.S. Patent No. 2,558,427 to H. C. Fagan, comprises the upper portion of the carrier 28. A pressure resistant housing 20, having a pressure resistant frangible plug 20a, forms the lower portion of the carrier 28. Enclosed in the housing 20 is an electrical detonator 29 connected by a detonating fuse 33 to a shaped explosive charge 32, which is adapted to direct an explosive jet downwardly at the booster 34 through the frangible plugs 20a and 31. The detonator 29 is connected by a conductor 23a to the casing collar locator 21 and may be grounded by a conductor 30 to the housing 20.

The electrical connections of the casing collar locator 21 and the igniter 29 by the conductors 23 and 23a and the switch 24 to a source 26 and an indicator 25 are preferably made in according with the disclosure in the copending application Serial No. 322,070, filed November 22, 1952, now U.S. Patent No. 2,732,518, dated January 24, 1956, by J. M. Bricaud for "Bore Hole Detecting Circuit and Bore Hole Firing Circuit Utilizing a Common Transmission Channel." Thus, the switch 24 is adapted to be operated selectively to connect the conductor 23 to the indicator 25 for the utilization of the casing collar locator 21, and to the source 26 when detonation of the perforating apparatus 18 is desired.

In one manner of operation, the bore hole 10 is lined with casing 11 and the tubing 17 with the perforating apparatus 18 attached thereto is lowered into the bore hole and set by the packer 27 therein. The production equipment 14 and the conventional Christmas tree 15 and the lubricator 16 are next placed in position. It should be understood that during the setting of the tubing and associated perforating apparatus, there is no possibility of an accidental detonation of the latter, since the booster charge 34 can be set off only by a relatively great explosive force and no detonating means is present.

In order to perforate the productive formation 13 opposite the perforating apparatus 18, the carrier 28 is inserted in the lubricator 16 and lowered through the tubing 17 by the cable 22 to the lower end of the tubing. In positioning the carrier 28, the indicator 25 is connected by the switch 24 and the conductor 23 to the casing collar locator 21, enabling the carrier 28 to be accurately located immediately above the frangible plug 31. The switch 24 may now be operated to connect the conductor 23 to the source 26, thereby energizing the electric detonator 29. This results in the detonation of the shaped charge 32 by the explosive fuse 33 and the generation of an explosive jet which perforates the frangible plugs 20a and 31 and detonates the booster charge 34.

In turn, the explosive fuse 35 is detonated, setting off the shaped charges 38. After a very short time lag, the severing charge 40 is ignited severing the housing 60 from coupling 19 and allowing it to drop harmlessly to the bottom of the well. The carrier 28 may then be withdrawn and a clear passage is provided through the tubing 17, the nipple 17a and the coupling 19 into the casing 11.

Figure 3:
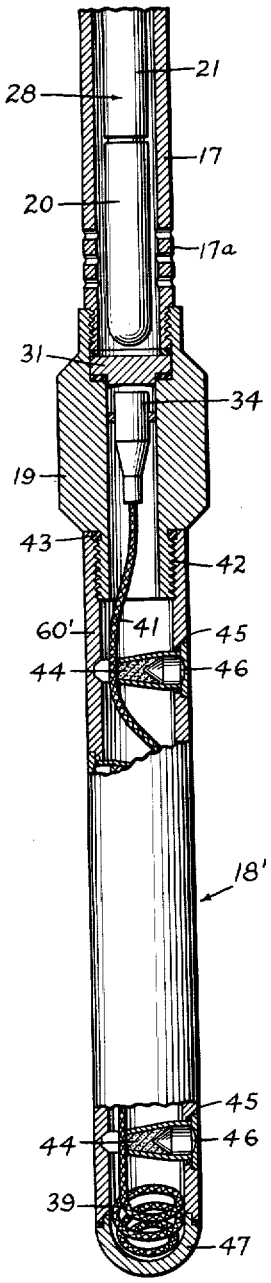
FIG. 3 is a view partially in longitudinal section of another form of explosive charge device with which the detonating means of the present invention may be used.

FIG. 3 shows the detonating means of FIGS. 1 and 2 in a different form of perforating apparatus wherein the housing is not destroyed. In this figure, elements similar to those in FIG. 2 are given the same numerical designations. The perforating apparatus 18' comprises a housing 60' constructed of a sturdy material such as steel, which is connected to the coupling 19 as, for example, by the threads 42 and is made pressure resistant by an annular seal 43. The perforating apparatus 18' may be constructed in accordance with the showing in FIGS. 4 and 5 of copending application Serial No. 123,003, filed October 22, 1949, by A. Blanchard for "Shaped Charge Perforating Apparatus." Thus, a plurality of shaped explosive charges 44 are inserted in the housing 60' opposite ports 45 having pressure resistant frangible plugs 46 set therein. An explosive fuse 41 is threaded through the rear portions of the charges 44.

Inserted in the lower end of the housing 60' is a pressure resistant frangible plug 47, which is adapted to rupture and leave the end of the housing 60' free upon detonation of the explosive charges 44. To insure complete rupture, the fuse 41 may be extended to form a coil 39 within the plug 47. After the shaped explosive charges have been detonated and the plug 47 ruptured, a clear channel will exist from the end of the tubing 17 through the coupling 19 and the housing 60' into the well 10. Thus, if it is necessary to perforate a second formation somewhat below the formation 13, a perforating gun of the type disclosed in the aforementioned Robertson application may be lowered through such channel to a position adjacent the second formation. Additionally, the ports 45 will be opened to provide further access to the tubing 17 for the fluid from the formation 13.

If it is necessary or desirable to fire the perforating apparatus in the well without employing an electric supporting cable, detonating means like that shown in the housing 20 of FIGS. 1 and 2 may be enclosed in a pressure resistant housing that can be dropped into the well. Timing mechanism may be employed for initiating detonation or mechanical means actuable by a weighted member dropped into the well, for example, may be provided for this purpose.

The novel detonating devices of the invention can obviously be employed in bore holes for other purposes. Thus, the detonating means shown in FIGS. 1 and 2 may be used to insure safety when large charges of explosives are exploded in the well to improve production. As a further example, these devices, due to the concentrated jet supplied from a pressure resistant housing, may be helpful in removing impediments found in bore holes or tubing without injury thereto.

Accordingly, novel methods and apparatus have been provided for effectively detonating explosive charges in relatively inaccessible places such as bore holes drilled into the earth with improved safety.

It should be understood that the methods and apparatus described herein are illustrative only and numerous modifications within the scope of this invention will suggest themselves to persons skilled in the art. Therefore, the embodiments described above and shown in the drawing are not to be regarded as limiting the scope of the appended claims.

I claim:

1. In apparatus for use in a well having a string of narrow diameter tubing set therein, the combination of means forming a perforated portion at the lower end of said tubing, a hollow tubular housing secured to said tubing in alignment therewith and below said perforated portion, explosive jet frangible closure means sealing off said housing below said tubing perforated portion, at least one shaped explosive charge device in said housing, explosive means at the lower end of said housing for rupturing the same, means for detonating said shaped explosive charge device and said explosive means, means in said housing immediately subjacent to said closure means actuatable by an explosive jet for initiating said detonating means, and explosive jet producing means lowerable inside said tubing from the surface and adapted to direct an explosive jet through said closure means and into impingement with said initiating means for rupturing said closure means and actuating said initiating means.

2. In apparatus for use in a well having a string of narrow diameter tubing set therein, the combination of means forming a perforated portion at the lower end of said tubing, a hollow tubular housing secured to said tubing in alignment therewith and below said perforated portion, sleeve means of greater diameter than said housing snugly fitted on the lower end of said tubing above the perforated portion of said tubing and extending towards the lower end of said housing, explosive jet frangible closure means sealing off said housing below said tubing perforated portion, at least one shaped explosive charge device in said housing having detonating means therefor, means in said housing immediately subjacent to said closure means actuatable by an explosive jet for initiating said detonating means, and explosive jet producing means lowerable inside said tubing from the surface and adapted to direct an explosive jet through said closure means and into impingement with said initiating means for rupturing said closure means and actuating said initiating means.

3. In apparatus for use in a well having a string of narrow diameter tubing set therein, the combination of means forming a perforated portion at the lower end of said tubing, a hollow tubular housing secured to said tubing in alignment therewith and below said perforated portion, explosive jet frangible closure means sealing off said housing below said tubing perforated portion, at least one shaped explosive charge device in said housing, explosive means near the upper end of said housing and above said shaped explosive charge device for shearing off the portion of said housing below said explosive means, means for detonating said shaped explosive charge device and for subsequently detonating said shearing explosive means, means in said housing immediately subjacent to said closure means actuable by an explosive jet for initiating said detonating means, and explosive jet producing means lowerable inside said tubing from the surface and adapted to direct an explosive jet through said closure means and into impingement with said initiating means for rupturing said closure means and actuating said initiating means.

*4. The method of perforating a well comprising, lowering a loaded perforating gun, with a primer cord for firing it, into a well and positioning the gun at the desired depth, then lowering an explosive charge until the charge is positioned adjacent a portion of the primer cord which forms a part of the perforating gun and which when ignited will fire the gun, and setting off the explosive charge to ignite the primer cord.*

*5. A perforating gun for wells, comprising, a carrier having securing means adapted to be secured to the bottom of a string of tubing, a stop part adjacent the top of the carrier and positioned to block the passage of a body entering the carrier through said securing means, a primer cord, which when ignited will fire the perforating gun, extending along said carrier and having a portion of its length positioned directly below the stop part and a portion positioned to fire the gun when the cord is ignited, and an actuator comprising a body adapted to be lowered into the carrier through said securing means until the actuator reaches the stop part, a downwardly firing charge in the nose of said body and means for firing said charge, whereby the primer cord will be ignited by the charge when the actuator is fired while adjacent the stop part.*

References Cited in the file of this patent or the original patent

UNITED STATES PATENTS

| | | |
|---|---|---|
| 1,832,924 | Bleecker | Nov. 24, 1931 |
| 2,058,287 | Anderson | Oct. 20, 1936 |
| 2,120,615 | King | June 14, 1938 |
| 2,396,768 | Ahlgren | Mar. 19, 1946 |
| 2,420,201 | Seavey | May 6, 1947 |
| 2,587,244 | Sweetman | Feb. 26, 1952 |
| 2,627,160 | MacDonald | Feb. 3, 1953 |
| 2,629,325 | Sweetman | Feb. 24, 1953 |
| 2,630,188 | Hawkins et al. | Mar. 3, 1953 |